April 28, 1942.  L. W. DYER ET AL  2,280,899

UNDERVOLTAGE MECHANISM FOR CIRCUIT BREAKERS

Filed Sept. 30, 1939  4 Sheets-Sheet 1

WITNESSES:
Wm. B. Sellers.
Nw. C. Groome

INVENTORS
Lloyd W. Dyer and
Gayne D. Gamel.
BY
O. B. Buchanan
ATTORNEY

April 28, 1942.  L. W. DYER ET AL  2,280,899
UNDERVOLTAGE MECHANISM FOR CIRCUIT BREAKERS
Filed Sept. 30, 1939  4 Sheets-Sheet 2

WITNESSES:

INVENTORS
Lloyd W. Dyer and
Gayne D. Gamel.
BY
ATTORNEY

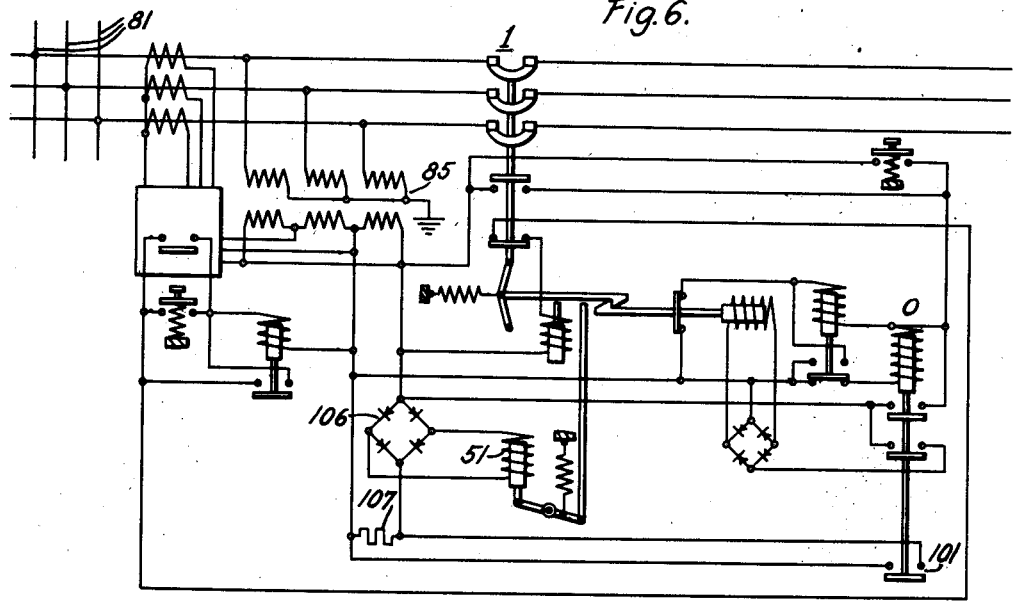

Patented Apr. 28, 1942

2,280,899

UNITED STATES PATENT OFFICE 2,280,899

UNDERVOLTAGE MECHANISM FOR CIRCUIT BREAKERS

Lloyd W. Dyer, Wilkinsburg, and Gayne D. Gamel, Verona, Pa., assignors to Westinghouse Electric & Manufacturing Company, East Pittsburgh, Pa., a corporation of Pennsylvania Application September 30, 1939, Serial No. 297,332

18 Claims. (Cl. 175—294)

Our invention relates to undervoltage tripping-mechanisms for circuit breakers or other switching devices, for causing an opening operation of the circuit breaker or other switching device in response to a predetermined undervoltage condition on the bus to which the undervoltage device is connected, such bus being either responsive to the line-voltage, on either side of the circuit breaker, or to the voltage of an auxiliary source, such as a battery, which is so important that it is not expedient to permit the circuit breaker to remain closed when this auxiliary voltage begins to fail too badly.

A serious limitation has been imposed, heretofore, on the design of such undervoltage mechanisms, by reason of the requirement that such mechanisms should have to be able to have their movable armatures in their picked-up position at the instant of closure of the main contacts of the circuit breaker, and during the brief transient thereafter when the entire circuit-breaker structure is jarring more or less violently as a result of the impact of the closing mechanism; and it is an important object of our invention to provide means, which are automatically effective at the moment of the completion of the closing-operation, for preventing the immediate occurrence of an opening-operation as a result of unreliable performance of the undervoltage controlling-means at this moment.

A more specific object of our invention is to provide a short period of time during which an abnormally high voltage is applied to the operating coil of the undervoltage controlling-means during the period when the operating mechanism of the circuit breaker is being energized to reclose the circuit breaker, particularly in automatic reclosing installations where the reclosing operation follows immediately after the tripping operation in the shortest possible time. By this means, we build up the flux in the undervoltage controlling-means to an abnormally high value, by the time the closing mechanism has completed its stroke, so that the undervoltage controlling-means is well able to maintain its armature in the actuated position notwithstanding the shock of closure of the circuit breaker, the magnetic flux in the undervoltage controlling-means being thereafter reduced to its normal response-ratio with respect to the voltage of the line to which it is connected.

In this connection, our invention is particularly applicable in undervoltage controlling-means in which the operating coil is energized with unidirectional current in response to the voltage of a predetermined bus, and in which the operating coil is shunted by a capacitor which normally serves the function of introducing a certain time-delay, after a sudden drop in the voltage of the predetermined bus, before the voltage appearing across the operating coil is correspondingly reduced. Such a time-delay capacitor introduces a serious handicap, however, when an attempt is made to very quickly reclose the circuit breaker after it has been tripped in response to an undervoltage condition, because the capacitor increases the time which is required to again build up the normal voltage in the operating coil of the undervoltage controlling-means, and hence our invention is particularly needed in such installations.

Another specific object of our invention is to provide momentary overvoltage charging-means to the operating coil of the undervoltage controlling-means, in installations in which the said operating coil is disconnected from its predetermined bus when the circuit breaker opens, and in which the said operating coil is reconnected to its predetermined bus at the instant when the circuit-breaker operating-mechanism is energized to reclose the circuit breaker. Heretofore, such installations have involved a very delicate electrical-design problem in balancing the requirements, (1) that the undervoltage controlling-means must build up its flux fast enough to have fully picked up its armature before the moment of completion of the closing stroke of the circuit-breaker operating-mechanism, (2) that the undervoltage controlling-means must be able to hold its armature in its picked-up position during the shock incident to the completion of the closing stroke of the circuit breaker, and (3) that the undervoltage controlling-means must drop out its armature at some predetermined minimum voltage such as 70% of the normal voltage of the bus to which the operating coil of the undervoltage controlling-means is connected. Our invention obviates this difficulty, in momentarily applying an overvoltage to the operating coil of the undervoltage controlling-means during the closing operation of the circuit breaker.

A still further object of our invention has to do with overcoming problems incident to installations in which a mechanically operated, so-called "retrieving" means is utilized for automatically retrieving the armature of the undervoltage controlling-means to its picked-up position whenever the circuit breaker is tripped to its open position, the conclusion of the opening stroke of the circuit breaker being utilized to restore the undervoltage controlling-means to its picked-up position, even though the operating coil of the undervoltage controlling-means is not at that moment energized with a sufficient voltage to cause it to magnetically pick up its armature. Heretofore such retrieving mechanisms have necessarily had to provide a certain amount of loose-play, to prevent binding of the parts, with the result that the armature of the undervoltage controlling-means has not been tightly held against its magnetic circuit by the retrieving means, and this has introduced a particularly difficult problem in installations in which the operating coil of the undervoltage controlling-means is energized by direct current rather than by alternating current, because direct-current coils are much more sensitive to the presence of small air-gaps between their armatures and the rest of the magnetic circuit than is the case with alternating-current coils. In accordance with our invention, this difficulty is obviated by interposing a spring between the retrieving mechanism and the movable armature of the undervoltage controlling-means, so that the retrieving mechanism is able to tightly hold the movable armature against its seat in a retrieved position of the undervoltage controlling-means.

A still further object of our invention is to provide for cases in which the operating coil of the undervoltage controlling-means is energized from the line or load side of the circuit breaker, so that it receives no energization at all until the closure of the main circuit-breaker contacts, near the completion of the closing stroke of the operating mechanism. Such installations have heretofore introduced a more or less serious design-limitation to meet the requirement that the retrieving mechanism should not be released, during the closing stroke of the operating mechanism, until after the main contacts of the circuit breaker had been closed and until time had been allowed for the magnetic flux to be built up in the undervoltage controlling-means to a sufficient extent to retain the armature in its picked-up position. In accordance with our invention, this difficulty is obviated by the provision of a latch, or other means, energized from a local battery, or other auxiliary source, during the closing operation of the circuit-breaker mechanism, so as to retain the armature of the undervoltage controlling-means in its picked-up position after the release of the retrieving mechanism, and until a short moment of time after the completion of the closing stroke of the circuit breaker.

With the foregoing and other objects in view, our invention consists in the circuits, systems, methods, apparatus, combinations and parts hereinafter described and claimed, and illustrated in the accompanying drawings wherein:

Figs. 4 to 8, inclusive, are electric-circuit diagrams illustrating different applications of the circuit breaker and mechanism shown in Figs. 1 to 3, in accordance with our invention.

Figure 1:
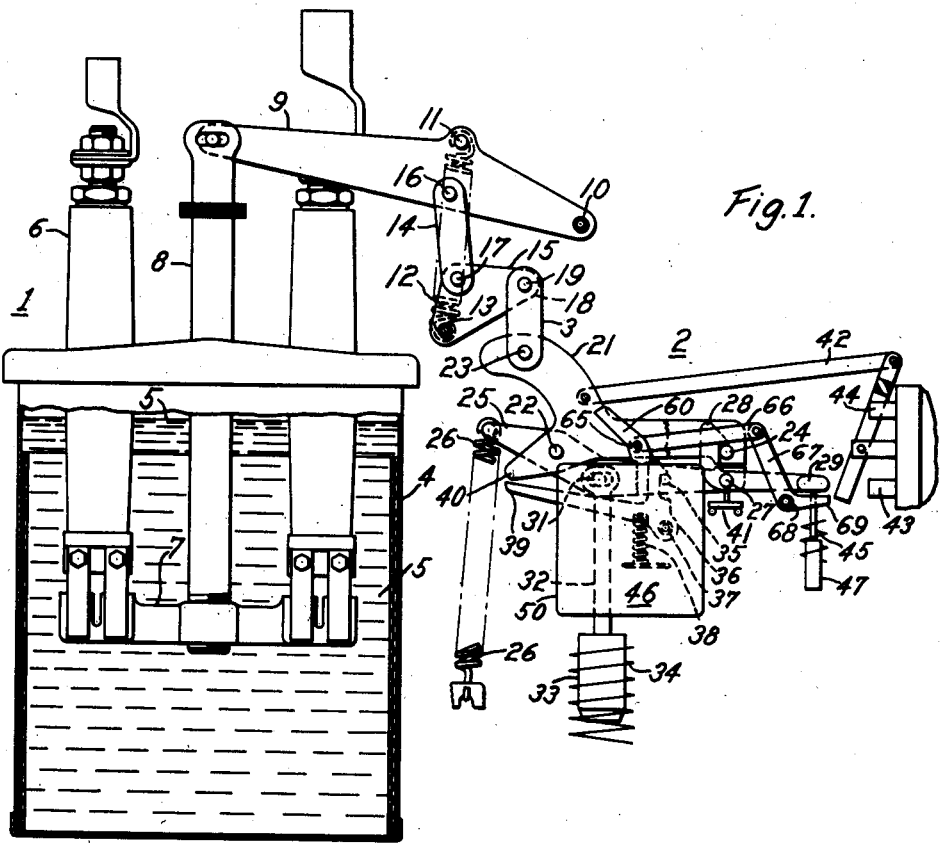
Figure 1 is a simplified elevational view of a circuit breaker, with its operating mechanism, embodying our invention.
Figure 2:
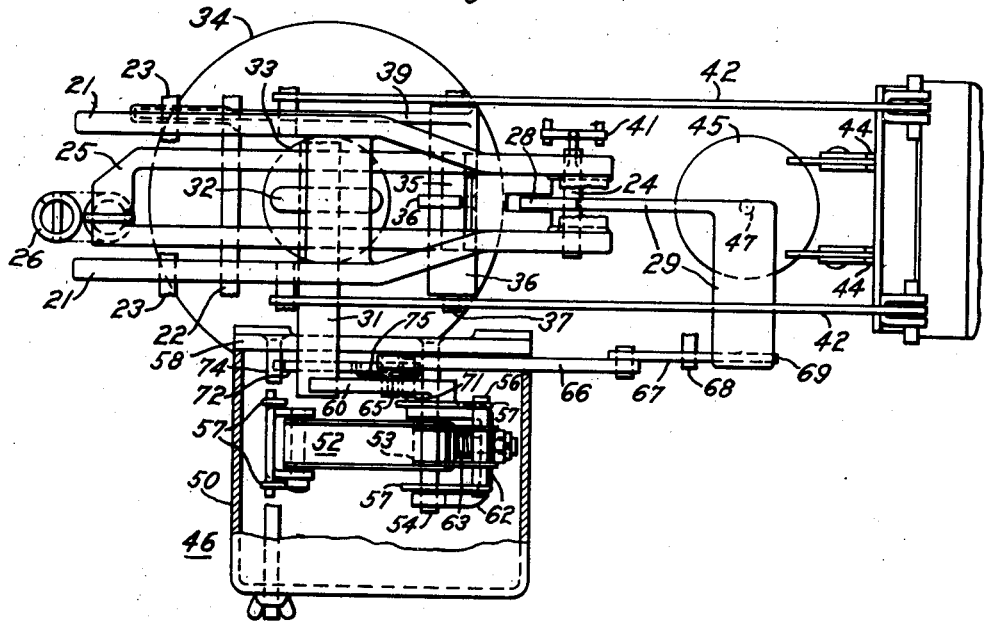
Fig. 2 is a plan view of the operating mechanism, on a somewhat larger scale than Fig. 1, with parts broken away to show the construction.
Figure 3:
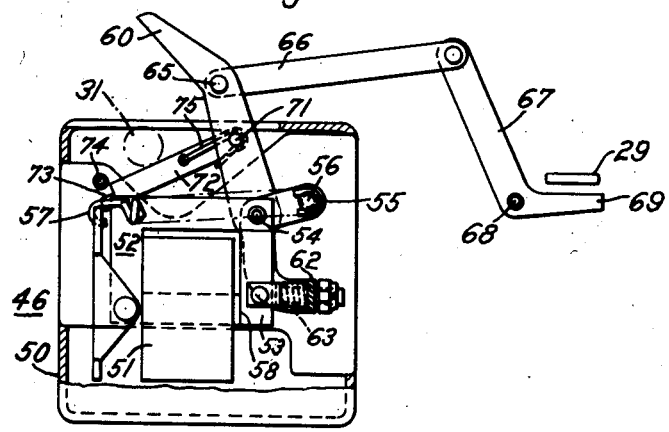
Fig. 3 is an elevational view of the undervoltage controlling-means of Figs. 1 and 2, with parts broken away to show the construction.

While our invention is not limited to any particular type of circuit breaker or switching device, we have shown it, by way of illustration, in Figs. 1 to 3, as being applied to an oil circuit breaker 1 which is opened and closed by an operating mechanism 2 which is connected to the circuit breaker by means of a connecting link 3.

The illustrated circuit breaker 1 comprises a tank 4 which is nearly filled with oil 5 and which is provided with one or more pairs of insulatedly mounted stationary contacts 6. Cooperating with each pair of stationary contacts 6 is a moving contact 7 carried by a lifting rod 8 which is supported on one end of a main lever 9, the other end of which is pivoted at a fixed point 10. The main lever 9 is acted upon, at an intermediate point 11, by a powerful opening-spring 12, the other end of which is connected to a fixed point 13. The main lever 9 is actuated by means of a toggle link 14 and a toggle lever 15, the link 14 being connected to the main lever 9 at an intermediate point 16 which is close to the intermediate point 11 which is engaged by the opening-spring 12. The toggle lever 15 is pivoted at the fixed point 13 and is also pivotally connected to the toggle link 14 by means of the pivot 17. The toggle lever 15 is further provided with a lateral arm 18 which is pivoted, at 19, to the top of the connecting rod 3 which extends to the operating mechanism 2.

The illustrated mechanism 2 comprises an outer lever 21 which is intermediately pivoted on a fixed pivot 22. One end of the outer lever 21 is pivoted, at 23, to the bottom of the connecting link 3 which leads to the circuit breaker. The other end of the outer lever 21 is provided with a latch-pin 24. Mounted on the same fixed pivot 22 as the outer lever 21 is an inner lever 25, one end of which is engaged by a retrieving spring 26, while the other end carries a pivot-pin 27 which pivotally supports a tripping latch 28, one end of which is elongated to constitute a tripping lever 29.

The inner lever 25, at an intermediate point close to the fixed pivot 22, and on the same side thereof as the tripping latch 28 is provided with a retrieving pin 31 which engages an eye bolt 32 in the top of a moving core or armature 33 which is drawn downwardly by a closing coil 34 when the circuit breaker is to be closed, the parts being illustrated in the closed position of the circuit breaker.

The inner lever 25 is also provided, at another intermediate point between the retrieving pin 31 and the tripping latch 28, with a main latch-pin 35 which is engaged by a main latch 36 which is pivoted on a fixed pivot-pin 37. The main latch 36 is biased toward its latch-engaging position by a spring 38, and it is also provided with a tail or arm 39 which is adapted to be engaged by a projection 40 on the outer lever 21 during the tripping stroke of the mechanism, as will be subsequently described. Carried by some convenient part of the inner lever 25 of the mechanism 2, we have provided a mechanism interlock contact 41 which is closed just before the mechanism reaches its fully closed position in its closing stroke.

Carried by the outer lever 21, or other convenient part which moves with the moving contact 7 of the circuit breaker, we have provided a switch-link 42 which operates one or more back-contacts 43 which are closed when the circuit breaker is open, and one or more front-contacts 44 which are closed when the circuit breaker is closed.

The tripping of the circuit breaker is effected, in the illustrated embodiment of our invention, by the operation of either a shunt trip-coil 45 or an undervoltage controlling-means 46, both of which effect tripping by pushing up on the tripping lever 29. The shunt trip-coil 45 is illustrated as a solenoid which raises an armature 47 to trip the tripping lever 29.

In the illustrated embodiment of our invention, the undervoltage controlling-means 46 comprises a casing 50 which contains a clapper-type electromagnet comprising an undervoltage coil 51 (Fig. 3) which energizes a magnetic circuit including an electromagnet-frame 52 and a pivoted armature 53. The armature 53 is pivoted, at one end 54, to one leg of the magnetic circuit 52. The pivoted end of the armature 53 also carries a laterally extending portion 55 which is connected, at 56, to one end of a tripping spring 57 which biases the pivoted armature 53 toward its open position away from its seat 58 on the magnetic circuit 52.

We have also illustrated the undervoltage controlling-means as being provided with a mechanically-operated retrieving means which operates to restore the pivoted armature 53 to its picked-up position (or to insure that it is in such picked-up position) during the opening stroke of the mechanism. This retrieving means includes a long curved reset lever 60 which is intermediately pivoted on the fixed armature-pivot 54. The top end of the reset lever 60 is curved so as to overlie the retrieving pin 31, so as to be pressed upwardly by the retrieving pin 31 in the extreme limit of upward travel of the retrieving pin, that is, at the end of the opening or tripping stroke of the mechanism. The bottom end of the reset lever 60 is provided with a bent extension 62 which, in accordance with our invention, is connected to the pivoted armature 53 through the intermediary of a spring 63 which makes it possible for the reset lever 60 of the retrieving means to press the pivoted armature 53 firmly closed, against its seat 58, and against the bias of its tripping spring 57, in the open or upper position of the retrieving pin 31. The spring 63 permits the reset lever to continue to move, through a certain angle, after the pivoted armature 53 has been retrieved or closed, thus providing the necessary element of loose-play, and also insuring a firm seating of the pivoted armature 53 in its retrieved position.

At an intermediate point in the upper end of the reset lever 60, said lever is provided with a pivot-pin 65 which carries a link 66, the other end of which operates a latch-tripping bell-crank 67 which is pivoted on a fixed pivot 68, and which carries a tripping arm 69 underlying the tripping lever 29 of the tripping latch 28.

The upper end of the reset lever 60 is also provided with another pivot-pin 71 which carries one end of a latch-link 72, the outer end of which is notched as indicated as 73 (Fig. 3) to engage a fixed stud 74, the latch-link 72 being biased in an upward direction by means of a spring 75. This latch-link 72 is so disposed that it is depressed by the retrieving pin 31 in the extreme lower position thereof, that is, in the closed position of the circuit-breaker operating-mechanism, so that when the circuit breaker 1 is closed, the latch-link 72 is held away from its fixed stud 74, thus placing the reset lever 60 under the control of the pivoted armature 53 of the undervoltage controlling-means 46.

The mechanical operation of the circuit breaker and mechanism shown in Figs. 1, 2 and 3 is as follows. Assuming that the circuit breaker is in its closed position, as illustrated, it is tripped by an upward movement of either the armature 47 of the shunt trip-coil 45 or the tripping arm 69 of the undervoltage controlling-means 46. The armature 47 is lifted up when the shunt trip-coil 45 is energized. The tripping arm 69 is lifted up, through the linkage 66 and 69, under the influence of the tripping spring 57, whenever the magnetic pull of the undervoltage coil 51 on the pivoted armature 53 becomes insufficient to overcome the bias of the tripping spring 57. The undervoltage controlling-means is usually adjusted so that this dropout point occurs at some predetermined voltage such as 70% of the normal voltage which is normally impressed upon the coil 51. When the pivoted armature 53 "drops out," or swings away from the magnetic circuit 52 of the coil 51, under the influence of the tripping spring 57, it carries with it the reset lever 60 which, in turn, pulls on the link 66 to actuate the latch-tripping bell-crank 67, thus elevating the tripping arm 69 into engagement with the tripping lever 29.

When the tripping lever 29 is elevated, in response to either an energization of the shunt trip-coil 45 or a dropout movement of the pivoted armature 53 of the undervoltage controlling-means, the tripping latch 28 (Fig. 1) is disengaged from the latch-pin 24, permitting the left-hand end of the outer lever 21 to be pressed down by the connecting link 3, under the influence of the powerful opening-spring 12 of the circuit breaker 1. The outer lever 21 then swings about its fixed pivot 22, in a counterclockwise direction, free of control by the inner lever 25 of the mechanism, hence giving the mechanism its name, trip-free. The opening-spring 12 thereupon pulls the main circuit-breaker lever 9 downwardly, thus moving the moving-contact 7 down, away from the stationary contact 6, effecting an opening or tripping operation of the circuit breaker.

Near the end of the tripping stroke or movement of the outer lever 21 of the mechanism, the projection 40 thereon engages the tail 39 of the main latch 36, causing the latter to become disengaged from the latch-pin 35 carried by the inner lever 25. This permits the inner lever 25 to also swing in a counterclockwise direction, about the common fixed point 22, under the influence of the retrieving spring 26, causing this inner lever 25 to follow after the outer lever 21 until it becomes again latched thereto by means of the tripping latch 28 reengaging the latch-pin 24. When the inner lever 25 swings in a counterclockwise direction, it elevates the retrieving pin 31, lifting the moving core 33 of the closing mechanism.

The retrieving pin 31, at the beginning of its upward stroke, opens the mechanism interlock contact 41 (Fig. 1), and also releases the latch-link 72 (Fig. 3) so that its spring 75 can move it up into latching engagement with its fixed stud 74. This latching engagement of the latch-link 72 occurs immediately, if the undervoltage coil 51 is properly energized at the moment. If the undervoltage coil 51 is deenergized, or if it had become so weakly energized that the undervoltage armature 51 became released, the latching movement of the latch-link 72 will take place as soon as the reset lever 60 is moved up into the position which it has when the pivoted armature 53 of the undervoltage controlling-means is in its picked-up position. Near the completion of the upward stroke of the retrieving pin 31, this pin engages the reset lever 60, pushing it upwardly so as to close or reset the pivoted armature 53, whereupon the latch-link 72 immediately latches the reset lever in this position, by engaging the fixed stud 74. The tripping arm 69 of the undervoltage controlling-means is thus depressed, so as to be out of engagement with the tripping lever 29, placing the parts in a position ready for the reclosure of the circuit breaker 1.

When it is desired to reclose the circuit breaker, the closing-coil 34 (Fig. 1) is energized, causing it to draw down on its moving core 33, thus pulling down on the retrieving pin 31 which is carried by the inner lever 25. Since the inner and outer levers are latched together at 24—28, the retrieving pin 31, as it pulls down on the inner lever 25, moving the inner lever in a clockwise direction, also moves the outer lever 21 in the same direction, through the latch 28, thus causing the left-hand end of the outer lever 21 to elevate the connecting rod 3, thus elevating the main lever 9, through the toggle lever 15 and the toggle link 14. When the main lever 9 is lifted, it carries with it the moving contact 7 which is finally brought up into engagement with the stationary contacts 6, thus closing the breaker. During this closing stroke of the breaker, the front contacts 44 are closed and the back contacts 43 are opened, through the connection of the switch-link 42 with the outer lever 21. Near the end of the closing stroke of the mechanism, the clockwise movement of the inner lever 25 closes the mechanism interlock contact 41.

At the beginning of the closing stroke of the mechanism 2, the retrieving pin 31 first moves down from underneath the overhanging portion of the reset lever 60 (Fig. 3), so that the retrieving pin 31 no longer presses upwardly, or in a clockwise direction, against the reset lever 60. At this time, however, the reset lever 60 is still latched by means of the latch-link 72 so that it is not free to move in a counterclockwise position, and hence the armature 53 of the undervoltage controlling-means 46 is still held in its closed or picked-up position. Near the completion of the closing stroke of the circuit-breaker mechanism 2, the retrieving pin 31 moves down against the top of the latch-link 72 pushing the latter down, away from its fixed stud 74, thus releasing the armature 53 of the undervoltage controlling-means 46 from the closing pressure exerted by the spring 63 and the reset lever 60, so that the armature 53 is now under the control of the undervoltage coil 51.

Figure 4:
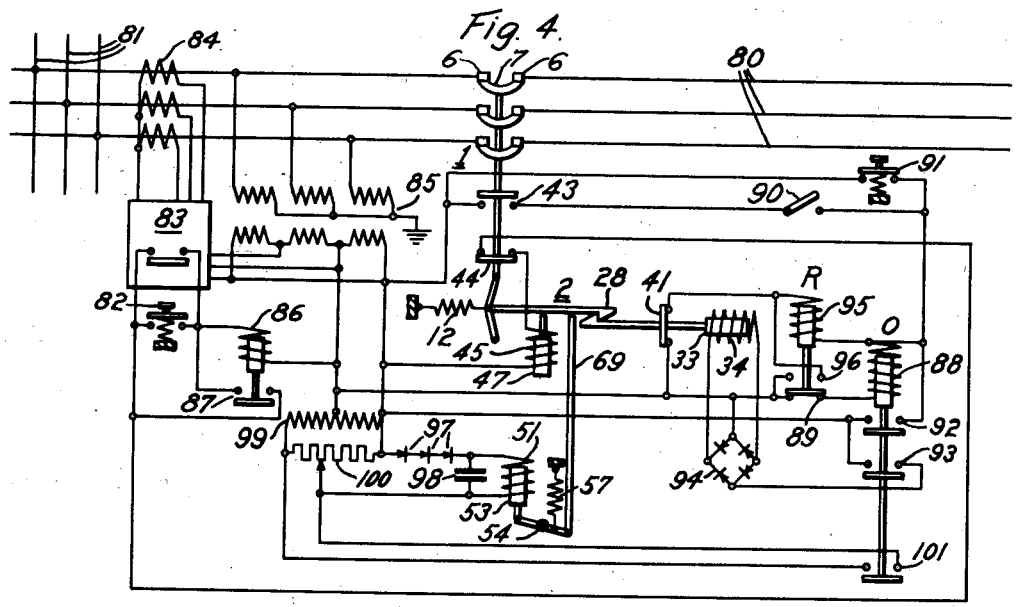

In Fig. 4, we show our invention utilized in an application in which the main contacts 6—7 of the circuit breaker 1 are connected in the three conductors of a three-phase line 80, for connecting and disconnecting the same to and from the corresponding conductors of a three-phase bus 81. In this embodiment of our invention, we indicate the shunt trip-coil 45 as being under the control of either a pushbutton 82 or an automatically operative fault-responsive relay which is symbolically indicated at 83, the latter being energized, with polyphase line-currents and line-voltages, through current-transformers 84 and potential-transformers 85, the latter being utilized also as a source of tripping-energy. In the circuit-arrangement shown in Fig. 4, the potential-transformers 85 are connected across the bus-side 81 of the circuit breaker 1. As is customary in circuits of this nature, we have also shown a contactor-switch 86, the operating coil of which is connected in series with the shunt trip-coil 45, so that the contactor 86 will pick up and close its contact 87, bypassing the light-weight contacts 82 and 83, and saving the latter from burning. The circuit of the tripping-coil 45 also includes the front contacts 44 of the circuit breaker, so that the trip-coil circuit is finally interrupted by the switch-contacts 44 during the opening stroke of the circuit breaker, after the tripping of the tripping latch 28.

In Fig. 4, we also show automatic means for instantly reclosing the circuit breaker 1 as soon as it opens. To this end, we utilize the back-contact 43 which closes when the circuit breaker opens. The closure of the contact 43 is utilized to energize the coil 88 of an operating-relay O, the energizing circuit of the coil 88 being completed through the back-contact 89 of a releasing-relay R. The circuit-breaker contact 43 is usually utilized in series with a switch 90 which may be either manually operated or automatically controlled in any desired manner, as by means of an operation-counter (not shown). The automatic reclosing contacts 43 and 90 are also bypassed by a pushbutton 91, which can be utilized to initiate the closing operation of the circuit breaker 1.

When the operating-relay 88 picks up, it seals itself in, through a make-contact 92, and at the same time, a second make-contact 93 energizes the closing coil 34 of the operating mechanism 2, causing the latter to reclose the circuit breaker. The closing coil 34 may be either an alternating-current coil or a direct-current coil, the latter being preferable, as indicated by the rectifier-bridge 94 which is included in its energizing-circuit.

The releasing-relay R is further provided with an actuating coil 95 and a make-contact 96. The actuating coil 95 of the releasing-relay R and the interlocking contact 41 of the mechanism 2 are connected in series with each other and in shunt relation to the actuating coil 88 of the operating-relay O and the back-contact 89 of the releasing-relay R. The make-contact 96 of the releasing-relay R is utilized to bypass the mechanism interlock contact 41 so as to prevent pumping of the circuit breaker.

In connection with the electric circuit diagrams shown in each of Figs. 4 to 8, inclusive, it will be noted that the trip-free feature is schematically indicated by means of a conventional showing of a latch 28, without any attempt to show the retrieving spring 26, the main latch 36 or the mechanism utilized in the complicated structure which has been illustrated and described in detail in connection with Figs. 1 to 3, inclusive. We desire it to be understood, however, that Figs. 4 to 8 apply to the structure which is shown in Figs. 1 to 3. The same remarks apply, also, in connection with the retrieving mechanism for resetting the armature 53 of the undervoltage coil 51, it being understood that some such retrieving mechanism, as is shown in Fig. 3, for example, is also utilized in the mechanisms which are schematically depicted in Figs. 4 to 8, inclusive.

Turning again to Fig. 4, we have shown our undervoltage coil 51 energized with direct current from one of the phases of the potential-transformers 85, the direct current being obtained by means of a rectifier 97. In order to retard the dropout action of the undervoltage coil 51, so as to prevent tripping in response to undervoltage dips of extremely short duration, the undervoltage coil 51, in Fig. 4, is shunted by a capacitor 98, which begins to discharge through the undervoltage coil 51 whenever the impressed line-voltage suddenly drops, thus interposing a certain time-delay before the drop in voltage appears across the terminals of the undervoltage coil 51. In order to obtain a voltage which is economical for the design of the capacitor 98, we have utilized a step-up autotransformer 99 and a potentiometer 100 for energizing the undervoltage coil 51 and its shunt-connected capacitor 98. When the undervoltage coil 51 drops out, the tripping spring 57 elevates the undervoltage tripping-arm 69, causing the latter to engage the tripping-latch 28, as described in connection with Figs. 1 to 3.

According to the embodiment of our invention which is shown in Fig. 4, we provide means for expediting the recharging of the capacitor 98, and the rebuilding of the flux in the magnetic circuit of the undervoltage coil 51, during the automatic reclosing-operation which automatically follows immediately upon the occurrence of a tripping-operation. To this end, we provide the operating-relay O with a third make-contact 101 which is utilized to short-circuit a portion of the potentiometer 100 during the closing stroke of the mechanism 2, so as to temporarily increase the ratio between the voltage applied to the undervoltage coil 51 and the line-voltage.

The reclosing operation of the embodiment of our invention shown in Fig. 4 is as follows. When a circuit is made, either by the pushbutton 91 or by the two serially-connected contacts 43 and 90, the operating-relay O is energized, thus applying energy to the closing coil 34 through the relay-contact 93, and at the same time increasing the response-ratio of the voltage applied to the undervoltage coil 51, together with its shunt-connected capacitor 98, through the relay-contact 101. The make-contact 92 of the operating-relay O bypasses the initiating control-contacts 91 or 43 and 90, so that the operating relay remains energized even if these initiating contacts may be opened again. Near the end of the closing stroke of the mechanism 2, the mechanism interlock contacts 41 are closed, thus energizing the actuating coil 95 of the releasing-relay R, in parallel-circuit relation to the actuating coil 88 of the operating-relay O. The energization of the releasing-relay R immediately opens its back-contact 89, deenergizing the operating-relay O and thus opening the three make-contacts 92, 93 and 101 of the latter relay, said contacts operating, respectively, to deenergize the releasing relay R (provided that the contacts 43—90 and 91 are open), to deenergize the closing coil 34, and to restore normal voltage-ratio conditions to the undervoltage coil 51.

In Fig. 4, the undervoltage coil 51 was utilized to detect an abnormal drop in voltage in an auxiliary bus which might be regarded as the secondary terminals of one of the potential-transformers 85.

Figure 5:
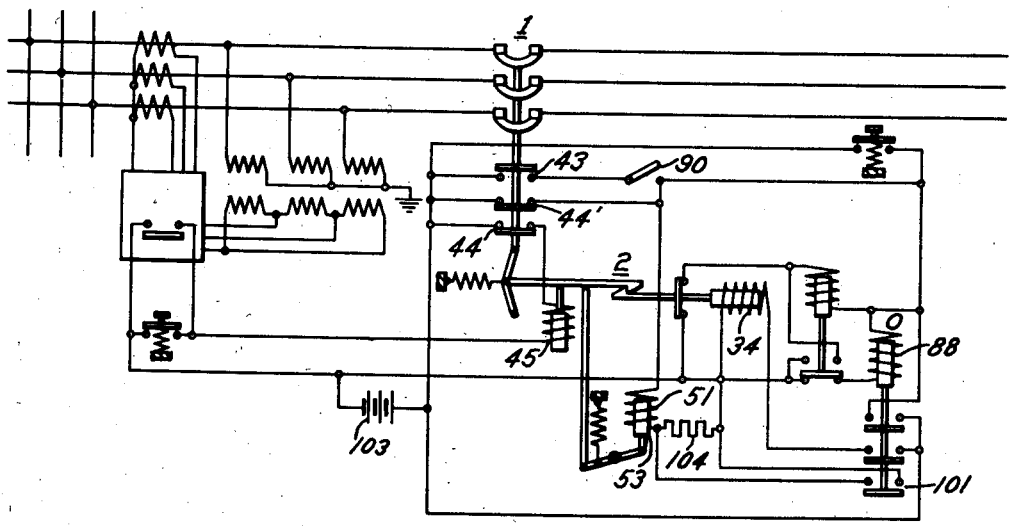

In Fig. 5, the undervoltage coil 51 is utilized to respond to an abnormal drop in the voltage of an auxiliary bus which may be regarded as the terminals of a storage battery 103, or other auxiliary source which is so important to the operation of the system that it is not expedient to permit the circuit breaker 1 to remain closed when this source begins to fail to a dangerously low voltage. For example, in Fig. 5, the auxiliary source 103 is utilized as a source of energy, not only for the closing-coil 34, but also for the tripping-coil 45, so that, if the source 103 should fail, it would thereafter be impossible to trip the circuit breaker. The undervoltage coil 51 is utilized, therefore, to trip out the circuit breaker if the voltage of the auxiliary source should drop to a predetermined value, such as 70% or any other percentage of its normal rated voltage.

In the particular embodiment of our invention which is shown in Fig. 5, we utilize circuit-means whereby the undervoltage coil 51 is energized from the auxiliary source 103 whenever the mechanism 2 is energized so as to close the circuit breaker 1, and whenever the circuit breaker 1 is in its closed position; the undervoltage coil 51 being disconnected from the source 103, so as to avoid any undue draining of said source, whenever the circuit breaker 1 is tripped to its open position. The contact-mechanism for performing this function includes the hereinabove-described contacts 43 and 90 which are utilized to initiate the energization of the actuating coil 88 of the operating-relay O, the same contacts being utilized to energize the undervoltage coil from the terminals of the auxiliary source 103. These contacts 43 and 90 are bypassed by an auxiliary front-contact 44' on the circuit breaker 1, so that the undervoltage coil 51 remains energized through said front-contact 44' as long as the circuit breaker 1 is closed; or any other equivalent contact-means may be utilized for accomplishing this function.

In the embodiment of our invention shown in Fig. 5, the undervoltage coil 51 is normally rated at a voltage considerably less than that of the auxiliary source 103 to which it is connected, and the difference in voltage is normally absorbed in a resistor 104 which is connected in series with the undervoltage coil 51. The third make-contact 101 of the operating-relay O is utilized, in Fig. 5, to short-circuit some or all of this serially-connected resistance 104 during the closing operation of the mechanism, so as to enable the undervoltage coil 51 to very quickly build up its flux, so that it will be able to finish picking up its armature 53 before the completion of the reclosing stroke of the mechanism 2, and so that it will also have enough magnetic force to hold its armature 53 firmly in its picked-up position without chattering as a result of the jarring of the entire mechanism upon the severe impact of the completion of the reclosing stroke.

In Fig. 6, we show an embodiment of our invention in which the undervoltage coil 51 is made to be responsive to the voltage of an auxiliary bus which may be regarded as the secondary terminals of one of the potential-transformers 85 which are energized from the bus 81, as in Fig. 4. However, in Fig. 6, a rectifier-bridge 106 is utilized to supply unidirectional current to the undervoltage coil 51, the input-diagonal of the bridge being energized from the auxiliary alternating-current bus in series with a resistor 107 which is cut out or short-circuited (partially or completely) by the relay-contact 101 of the operating-relay O during the period when the circuit breaker 1 is being closed.

Figure 8:
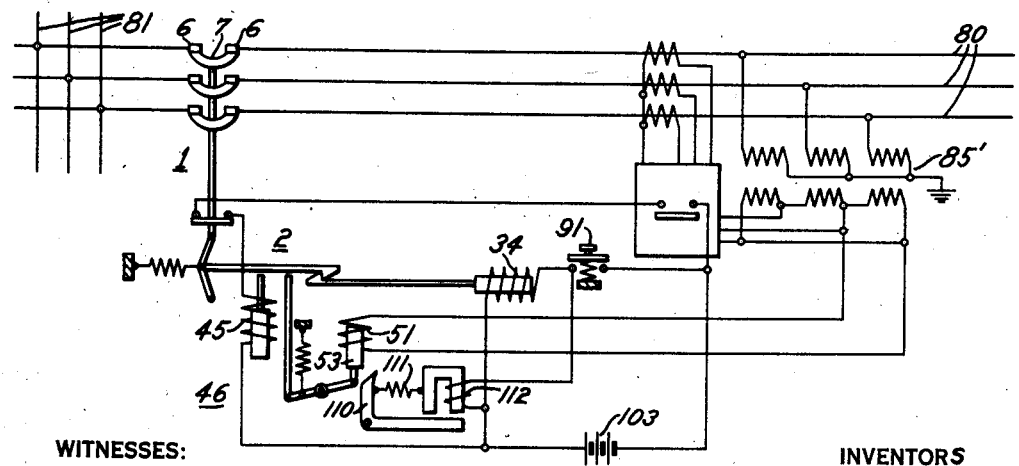

In Figs. 7 and 8, we show two forms of embodiment of our invention in applications in which control-potential is not available for the undervoltage coil 51 until the breaker is substantially completely closed, this control-potential being supplied, in the illustrated installations, by means of potential-transformers 85' which are connected on the line-side 80 of the main contacts 6—7 of the circuit breaker 1. In such systems, where the undervoltage control-potential is not available until the breaker is substantially fully closed, it is necessary to provide some auxiliary means for holding the undervoltage controlling-means in its closed position at the instant of completion of the closing stroke of the circuit-breaker mechanism, and for a very short duration of time after said completion, so as to allow time for the building-up of the flux in the magnetic circuit of the undervoltage controlling-device after potential is applied thereto. Even where a mechanically-operated retrieving-mechanism is utilized for the undervoltage controlling-device, for lifting the undervoltage armature and temporarily locking it in its lifted position during the tripping stroke of the circuit-breaker mechanism, (and it is presumed that such mechanical retrieving-mechanism is utilized in connection with all of the figures of our drawings), it will be recalled, from the description of Fig. 3, that such mechanical retrieving and locking mechanism has to be tripped out, near the end of the closing stroke of the circuit-breaker mechanism, when the retrieving pin 31 pulls down against the latch-link 72, so that, in Figs. 7 and 8, means must be provided for preventing the armature 53 of the undervoltage controlling-means from beginning to drop out as soon as the latch-link 72 is depressed.

In Fig. 7, the magnetic circuit 52 of the undervoltage controlling-means 46 is provided with an auxiliary coil 108, in addition to the undervoltage coil 51. The undervoltage coil 51 is energized from the secondary circuit of one of the line-energized potential-transformers 85', through a rectifier 97, with a time-delaying capacitor 98 connected in parallel with the coil 51. The auxiliary coil 108 is energized from the local battery 103, which is also utilized as a source of energy for both the tripping-operation and the closing-operation of the circuit-breaker mechanism 2. The energization of the auxiliary coil 108 from the local battery 103 is controlled by the relay-contact 101 of the operating-relay O, so that this energizing-circuit is made at the very beginning of the closing stroke of the circuit-breaker mechanism 2, and so that this energizing-circuit, for the auxiliary coil 108, is broken at substantially the end of the closing stroke of the circuit-breaker mechanism 2.

The auxiliary coil 108 (Fig. 7) is shunted by a time-delaying capacitor 109 which becomes effective, upon the opening of the relay-contact 101, to begin to discharge into the auxiliary coil 108, thus slightly prolonging the energization of this auxiliary coil after the opening of the electrical circuit at the relay-contact 101. The auxiliary coil 108 may also be sufficiently strongly energized to produce, in the magnetic circuit 52 of the undervoltage controlling-means 46, a magnetic flux which is larger than the flux needed to hold the armature 53 from dropping out in response to the tripping-spring 57, so that the time necessary for this excessive flux to die out of the magnetic circuit 52 may be utilized to secure the momentary time-delay which is necessary, after the opening of the relay-contact 101, and this operation may be utilized either as an adjunct to, or instead of, the shunting-capacitor 109.

In operation, the relay-contact 101 of Fig. 7 may drop out a moment before the closure of the moving contact 7 of the circuit breaker 1 and hence a moment before the energization of the undervoltage coil 51 from the auxiliary bus which is regarded as the secondary side of the line-energized potential-transformer 85', assuming that the line 80 is not energized until the moving contact 7 engages both of the cooperating stationary contacts 6 of the circuit breaker 1. It is possible that the circuit-breaker mechanism 2 could be designed so that the main contacts 6—7 are closed before the relay-contacts 101 open, but we prefer, in our mechanism, to provide the slight additional factor of safety which is afforded by causing the magnetic flux of the auxiliary coil 108 to hold on, for just a moment longer, after the opening of the relay-contact 101 of the operating-relay O. It is also important to select the polarities of the auxiliary coil 108 and of the undervoltage coil 51 so that they are the same, as otherwise it would be necessary for the flux which had been produced by the auxiliary coil 108 to be reduced entirely to zero before it could be built up again in the opposite direction by the undervoltage coil 51, thus resulting in the dropping-out of the armature 53 and the immediate tripping of the circuit breaker 1.

In Fig. 8, instead of utilizing the auxiliary coil 108 to hold up the armature 53 of the undervoltage controlling-means 46 at the moment of completion of the closing stroke of the mechanism 2, we utilize a mechanically engaging latch 110 which is drawn under the armature 53, against the bias of a spring 111, by means of an electromagnet 112, which is illustrated as being energized whenever the closing-coil 34 of the circuit-breaker mechanism 2 is energized. In the embodiment of our invention shown in Fig. 8, the energy for the closing-coil 34, as well as the energy for the tripping-coil 45 and the latch-magnet 112, is derived from an auxiliary storage battery 103. In the particular form of electrical connections shown in Fig. 8, a simple form of electric-circuit control, for the closing-coil 34, is shown, in the form of the pushbutton 91, which is utilized without the automatic closing means involving the auxiliary switch-contact 43 and the operating and releasing relays O and R which were shown in Fig. 4.

In Fig. 8, therefore, it is necessary to depress the pushbutton 91 in order to initiate the closing stroke of the mechanism 2, and it is necessary to hold down this pushbutton 91 until the closing stroke is completed, before the pushbutton 91 should be released. The closing stroke is so rapid, however, that an almost imperceptible hesitation, before releasing the pushbutton 91, is all that is required. While the pushbutton 91 is depressed, in Fig. 8, the latch-magnet 112 is energized, thus holding the latch 110 under, or back of, the armature 53 of the undervoltage controlling-means 46, until the time when the undervoltage coil receives its energy from the auxiliary bus provided by the secondary terminals of the line-energized potential-transformer 85'.

While we have illustrated our invention in several forms of embodiment, which are at present preferred by us, we wish such illustration to be regarded merely as an illustration and not in a limiting sense; as many modifications in physical structure and electrical circuits may be adopted by those skilled in the art, without departing from the essential spirit of the broader aspects of our invention. We desire, therefore, that the appended claims shall be accorded the broadest construction consistent with their language and the prior art.

We claim as our invention:

1. A switching device including main contacts, mechanism having an opening operation for effecting the separation of said main contacts and a closing operation for effecting the closure of said main contacts, an undervoltage controlling-means having a dropout operation for initiating an opening operation of the mechanism when the voltage impressed on the undervoltage controlling-means falls below a predetermined minimum, said mechanism including accelerating-means separate from said undervoltage controlling-means for thereafter completing the opening operation of the mechanism and closing-means separate from said undervoltage controlling-means for effecting a closing operation of the mechanism, means for normally energizing the undervoltage controlling-means in accordance with a predetermined response to a predetermined voltage, and means effective at the moment of the completion of the closing operation of the mechanism for providing additional preventive means for preventing the dropout operation of the undervoltage controlling-means.

2. A switching device including main contacts, mechanism having an opening operation for effecting the separation of said main contacts and a closing operation for effecting the closure of said main contacts, an undervoltage controlling-means having a dropout operation for initiating an opening operation of the mechanism when the voltage impressed on the undervoltage controlling-means falls below a predetermined minimum, said mechanism including accelerating-means separate from said undervoltage controlling-means for thereafter completing the opening operation of the mechanism and closing-means separate from said undervoltage controlling-means for effecting a closing operation of the mechanism, means for normally energizing the undervoltage controlling-means with a unidirectional current in accordance with a predetermined response to a predetermined voltage, and means automatically responsive during the closing operation of said mechanism for increasing the ratio of response of the voltage impressed upon the undervoltage controlling-means with respect to said predetermined voltage.

3. In an electrical station including an electric power bus, an electric power line, and an auxiliary bus, a switching device for connecting and disconnecting said power line to and from said power bus, said switching device including main contacts, mechanism having an opening operation for effecting the separation of said main contacts and a closing operation for effecting the closure of said main contacts, an undervoltage controlling-means having a dropout operation for initiating an opening operation of the mechanism when the voltage impressed on the undervoltage controlling-means falls below a predetermined minimum, said mechanism including accelerating-means separate from said undervoltage controlling-means for thereafter completing the opening operation of the mechanism and closing-means separate from said undervoltage controlling-means for effecting a closing operation of the mechanism, means for normally energizing the undervoltage controlling-means in accordance with a predetermined response to the voltage of said auxiliary bus, and means automatically responsive during the closing operation of said mechanism for increasing the ratio of response of the voltage impressed upon the undervoltage controlling-means with respect to the voltage of said auxiliary bus.

4. In an electrical station including an electric power bus and an electric power line, a switching device for connecting and disconnecting said power line to and from said power bus, said switching device including main contacts, mechanism having an opening operation for effecting the separation of said main contacts and a closing operation for effecting the closure of said main contacts, an undervoltage controlling-means having a dropout operation for initiating an opening operation of the mechanism when the voltage impressed on the undervoltage controlling-means falls below a predetermined minimum, said mechanism including accelerating-means separate from said undervoltage controlling-means for thereafter completing the opening operation of the mechanism and closing-means separate from said undervoltage controlling-means for effecting a closing operation of the mechanism, means for normally energizing the undervoltage controlling-means in accordance with a predetermined response to the voltage on the bus side of said switching device, and means automatically responsive during the closing operation of said mechanism for increasing the ratio of response of the voltage impressed upon the undervoltage controlling-means with respect to the bus voltage.

5. In an electrical station including an electric power bus and an electric power line, a switching device for connecting and disconnecting said power line to and from said power bus, said switching device including main contacts, mechanism having an opening operation for effecting the separation of said main contacts and a closing operation for effecting the closure of said main contacts, an undervoltage controlling-means having a dropout operation for initiating an opening operation of the mechanism when the voltage impressed on the undervoltage controlling-means falls below a predetermined minimum, said mechanism including accelerating-means separate from said undervoltage controlling-means for thereafter completing the opening operation of the mechanism and closing-means separate from said undervoltage controlling-means for effecting a closing operation of the mechanism, means for normally energizing the undervoltage controlling-means with a unidirectional current in accordance with a predetermined response to the voltage on the bus side of said switching device, a capacitor connected in shunt to the operating winding of said undervoltage controlling-means, and means automatically responsive during the closing operation of said mechanism for increasing the ratio of response of the voltage impressed upon the undervoltage controlling-means with respect to the bus voltage.

6. In an electrical station including an electric power bus, an electric power line, and an auxiliary bus, a switching device for connecting and disconnecting said power line to and from said power bus, said switching device including main contacts, mechanism having an opening operation for effecting the separation of said main contacts and a closing operation for effecting the closure of said main contacts, an undervoltage controlling-means having a dropout operation for initiating an opening operation of the mechanism when the voltage impressed on the under voltage controlling-means falls below a predetermined minimum, said mechanism including accelerating-means separate from said undervoltage controlling-means for thereafter completing the opening operation of the mechanism and closing-means separate from said undervoltage controlling-means for effecting a closing operation of the mechanism, means responsive to a substantially closed position of the switching device for energizing the undervoltage controlling-means in accordance with a predetermined response to the voltage of the auxiliary bus, and means effective at the moment of the completion of the closing operation of the mechanism for providing additional preventive means for preventing the dropout operation of the undervoltage controlling-means.

7. In an electrical station including an electric power bus, an electric power line, and an auxiliary bus, a switching device for connecting and disconnecting said power line to and from said power bus, said switching device including main contacts, mechanism having an opening operation for effecting the separation of said main contacts and a closing operation for effecting the closure of said main contacts, an undervoltage controlling-means having a dropout operation for initiating an opening operation of the mechanism when the voltage impressed on the undervoltage controlling-means falls below a predetermined minimum, said mechanism including accelerating-means separate from said undervoltage controlling-means for thereafter completing the opening operation of the mechanism and closing-means separate from said undervoltage controlling-means for effecting a closing operation of the mechanism, means responsive to a substantially closed position of the switching device for energizing the undervoltage controlling-means in accordance with a predetermined response to the voltage of the auxiliary bus, means automatically responsive, when the mechanism is energized to close the switching device, to energize the undervoltage controlling-means with an increased ratio of response to the voltage of the auxiliary bus, and means responsive to a substantially closed position of the switching device for preventing the mechanism from thereafter continuing to be energized to close the switching device.

8. In an electrical station including an electric power bus and an electric power line, a switching device for connecting and disconnecting said power line to and from said power bus, said switching device including main contacts, mechanism having an opening operation for effecting the separation of said main contacts and a closing operation for effecting the closure of said main contacts, an undervoltage controlling-means having a dropout operation for initiating an opening operation of the mechanism when the voltage impressed on the undervoltage controlling-means falls below a predetermined minimum, said mechanism including accelerating-means separate from said undervoltage controlling-means for thereafter completing the opening operation of the mechanism and closing-means separate from said undervoltage controlling-means for effecting a closing operation of the mechanism, means for normally energizing the undervoltage controlling-means in accordance with a predetermined response to the voltage on the line-side of the switching device, and means effective at the moment of the completion of the closing operation of the mechanism for providing additional preventive means for preventing the dropout operation of the undervoltage controlling-means.

9. In an electrical station including an electric power bus, an electric power line, and an auxiliary bus, a switching device for connecting and disconnecting said power line to and from said power bus, means for energizing said auxiliary bus when the switching device is closed and for deenergizing the auxiliary bus when the switching device is opened, said switching device including main contacts, mechanism having an opening operation for effecting the separation of said main contacts and a closing operation for effecting the closure of said main contacts, an undervoltage controlling-means having a dropout operation for initiating an opening operation of the mechanism when the voltage impressed on the undervoltage controlling-means falls below a predetermined minimum, said mechanism including accelerating-means separate from said undervoltage controlling-means for thereafter completing the opening operation of the mechanism and closing-means separate from said undervoltage controlling-means for effecting a closing operation of the mechanism, means for normally energizing the undervoltage controlling-means in accordance with a predetermined response to the voltage of said auxiliary bus, means automatically responsive during the opening operation of the mechanism for mechanically retrieving said undervoltage controlling-means to substantially the same position which it had when it was normally energized, and means automatically energized during the closing operation of the mechanism for preventing a dropout operation of the undervoltage controlling-means immediately upon the completion of the closing operation of the mechanism.

10. A switching device including main contacts, mechanism having an opening operation for effecting the separation of said main contacts and a closing operation for effecting the closure of said main contacts, an undervoltage controlling-means having a dropout operation for initiating an opening operation of the mechanism when the voltage impressed on the undervoltage controlling-means falls below a predetermined minimum, said mechanism including accelerating-means separate from said undervoltage controlling-means for thereafter completing the opening operation of the mechanism and closing-means separate from said undervoltage controlling-means for effecting a closing operation of the mechanism, means for normally energizing the undervoltage controlling-means in accordance with a predetermined response to a predetermined voltage, mechanical latch-means operative, when energized, to move to a latching position such as to prevent the immediate occurrence of an opening operation of the mechanism by reason of unreliable performance of the undervoltage controlling-means at this moment, means for electrically energizing said mechanical latch-means, and means, responsive to the closing operation of the mechanism, and before the completion of said closing operation, for momentarily energizing the mechanical latch-means.

11. A switching device including main contacts, mechanism having an opening operation for effecting the separation of said main contacts and a closing operation for effecting the closure of said main contacts, an undervoltage controlling-means having a dropout operation for initiating an opening operation of the mechanism when the voltage impressed on the undervoltage controlling-means falls below a predetermined minimum, said mechanism including accelerating-means separate from said undervoltage controlling-means for thereafter completing the opening operation of the mechanism and closing-means separate from said undervoltage controlling-means for effecting a closing operation of the mechanism, means for normally energizing the undervoltage controlling-means in accordance with a predetermined response to a predetermined voltage, mechanical latch-means operative, when energized, to move to a latching position such as to prevent a dropout operation of the undervoltage controlling-means immediately upon the completion of the closing operation of the mechanism, means for electrically energizing said mechanical latch-means, and means, responsive to the closing operation of the mechanism, and before the completion of said closing operation, for momentarily energizing the mechanical latch-means.

12. In an electrical station including an electric power bus, an electric power line, and an auxiliary bus, a switching device for connecting and disconnecting said power line to and from said power bus, means for energizing said auxiliary bus when the switching device is closed and for deenergizing the auxiliary bus when the switching device is opened, said switching device including main contacts, mechanism having an opening operation for effecting the separation of said main contacts and a closing operation for effecting the closure of said main contacts, an undervoltage controlling-means having a dropout operation for initiating an opening operation of the mechanism when the voltage impressed on the undervoltage controlling-means falls below a predetermined minimum, said mechanism including accelerating-means separate from said undervoltage controlling-means for thereafter completing the opening operation of the mechanism and closing-means separate from said undervoltage controlling-means for effecting a closing operation of the mechanism, means for normally energizing the undervoltage controlling-means in accordance with a predetermined response to the voltage of said auxiliary bus, means automatically responsive during the opening operation of the mechanism for mechanically retrieving said undervoltage controlling-means to substantially the same position which it had when it was normally energized, mechanical latch-means operative, when energized, to move to a latching position such as to prevent a dropout operation of the undervoltage controlling-means immediately upon the completion of the closing operation of the mechanism, means for electrically energizing said mechanical latch-means, and means, responsive to the closing operation of the mechanism, and before the completion of said closing operation, for energizing the mechanical latch-means.

13. In an electrical station including an electric power bus and an electric power line, a switching device for connecting and disconnecting said power line to and from said power bus, said switching device including main contacts, mechanism having an opening operation for effecting the separation of said main contacts and a closing operation for effecting the closure of said main contacts, an undervoltage controlling-means having a dropout operation for initiating an opening operation of the mechanism when the voltage impressed on the undervoltage controlling-means falls below a predetermined minimum, said mechanism including accelerating-means separate from said undervoltage controlling-means for thereafter completing the opening operation of the mechanism and closing-means separate from said undervoltage controlling-means for effecting a closing operation of the mechanism, means for normally energizing the undervoltage controlling-means in accordance with a predetermined response to the voltage on the line side of the switching device, means automatically responsive during the opening operation of the mechanism for mechanically retrieving said undervoltage controlling-means to substantially the same position which it had when it was normally energized, and means automatically energized during the closing operation of the mechanism for preventing a dropout operation of the undervoltage controlling-means immediately upon the completion of the closing operation of the mechanism.

14. A switching device including main contacts, mechanism having an opening operation for effecting the separation of said main contacts and a closing operation for effecting the closure of said main contacts, an undervoltage controlling-means having a dropout operation for initiating an opening operation of the mechanism when the voltage impressed on the undervoltage controlling-means falls below a predetermined minimum, said mechanism including accelerating-means separate from said undervoltage controlling-means for thereafter completing the opening operation of the mechanism and closing-means separate from said undervoltage controlling-means for effecting a closing operation of the mechanism, means for normally energizing the undervoltage controlling-means in accordance with a predetermined response to a predetermined voltage, and means automatically responsive during the opening operation of the mechanism for mechanically yieldably retrieving said undervoltage controlling-means to substantially the same position which it had when it was normally energized.

15. An undervoltage electromagnetic protective device comprising a biased movable armature, magnetizing-means including an operative coil for exerting a magnetic force tending to move the armature against its bias, normal energizing-means for supplying unidirectional energizing-current to the coil at a voltage which bears a predetermined response-ratio to the voltage of a predetermined source to which the device is to respond, a capacitor permanently connected in shunt to said coil, means for performing a predetermined function in response to each return of the armature to its biased position, and means automatically operative, on each movement of the armature to its biased position, to temporarily increase the ratio of the coil-voltage to the source-voltage.

16. An undervoltage electromagnetic protective device comprising a biased movable armature, magnetizing-means including an operative coil for exerting a magnetic force tending to move the armature against its bias, means for connecting and disconnecting the coil to and from a predetermined source of voltage, means automatically operative, immediately after each disconnecting operation which disconnects the coil from the source, to mechanically restore said armature substantially to its actuated position against its bias and independently of any magnetic force on said armature, means for performing a predetermined function in response to each return of the armature to its biased position, a latch, and means automatically operative, on each connecting operation which connects the coil to the source, to temporarily move the latch to a latching position such as to mechanically latch said armature in its actuated position, said last-mentioned means automatically releasing said latch after a very brief time of an order of magnitude suitable for preventing faulty operation as a result of transients incident to the operations accompanying the connection of the coil to the source.

17. A circuit-breaker combination comprising main circuit-interrupting relatively stationary and relatively movable contact-members, accelerating-means for biasing the movable contact-member toward its circuit-opening position, operating-mechanism comprising a movable closing-member, means whereby a closing-force and an opening-force may be exerted, at different times, on said movable closing-member, releasable holding-means for retaining said movable closing-member in its closed position, releasable holding and interlocking means for causing the movable contact-member to be closed, and to be held closed, by the closing of said movable closing-member, tripping-means for releasing said holding and interlocking means so that said accelerating-means may move said movable contact-member to its circuit-opening position, and means operated in response to the circuit-opening movement of said movable contact-member for releasing the holding-means of said movable closing-member, said releasable holding and interlocking means being returnable to its holding and interlocking condition when said closing-member is moved to its open position, said tripping-means comprising an undervoltage-responsive mechanism comprising a clapper-type electromagnet having an electromagnet-frame and a movable armature-arm, means for biasing said armature-arm toward an open position in opposition to the electromagnetic attraction, means for causing the flying-open movement of the armature-arm to effect the release of said holding and interlocking means, and lost-motion mechanical coupling-means between the movable closing-member of the breaker-mechanism and the movable armature-arm of the undervoltage-responsive mechanism, said mechanical coupling-means being automatically responsive to the opening operation of the breaker-mechanism to cause said armature-arm to be mechanically yieldably forced to its closed position and to permit the closing-member of the breaker-mechanism to continue through the final portion of its opening movement after said armature-arm has been forced to its closed position, and said mechanical coupling-means being automatically responsive to the closing operation of the breaker-mechanism to disengage its operative contact with the armature-arm.

18. A switching device including main contacts, operating-mechanism having an opening operation for effecting the separation of said main contacts and a closing operation for effecting the closure of said main contacts, an undervoltage controlling-means having a dropout operation for initiating an opening operation of said operating-mechanism when the voltage impressed on the undervoltage controlling-means falls below a predetermined minimum, said operating-mechanism including accelerating-means separate from said undervoltage controlling-means for thereafter completing the opening operation of the operating-mechanism and closing-means separate from said undervoltage controlling-means for effecting a closing operation of the operating-mechanism, and means for normally energizing the undervoltage controlling-means in accordance with a predetermined response to a predetermined voltage, characterized by said undervoltage controlling-means comprising an undervoltage-responsive mechanism comprising an electromagnet having an electromagnet frame and a movable armature, means for biasing said armature toward an open position in opposition to the electromagnetic attraction, and means automatically responsive during the opening operation of the operating-mechanism to cause the armature of the undervoltage mechanism to be mechanically yieldably forced to its attracted position relative to the electromagnet frame and to permit the operating-mechanism to continue through the final portion of its opening operation after said armature has been forced to its attracted position, said last-mentioned means being automatically responsive during the closing operation of the operating-mechanism to disengage its operative contact with the armature.

LLOYD W. DYER.
GAYNE D. GAMEL.